3,303,151
POLYMERIZATION PROCESS
Edwin F. Peters, Lansing, and Omar O. Juveland, South Holland, Ill., assignors to Standard Oil Company, Chicago, Ill., a corporation of Indiana
No Drawing. Filed Dec. 23, 1963, Ser. No. 332,904
5 Claims. (Cl. 260—28.5)

This invention relates to the preparation of a composition comprising a polymerized vinyl compound and asphalt or asphaltenes. More specifically, our invention is a novel process for polymerizing a lower 1-alkene in admixture with asphalt or asphaltenes, wherein the catalyst comprises the metallic components naturally occurring in the asphalt, in conjunction with a metallic reducing agent.

Solid polymers of polymerizable vinyl compounds have found uses in many applications, for example, as a wide variety of injection-molded and blow-molded articles, as films, as insulation, as tubing, etc. A defect in many of the solid polymer products, especially the solid polymerized lower 1-alkenes, is an inability to withstand degradation induced by exposure to ultra-violet light, as by simple exposure to sunlight. An expedient for improving such polymers is the incorporation of a filler material in the polymer, such as carbon black, which stabilizes the polymer. One aspect of our inventive process is the preparation of polymerized vinyl compounds containing asphalt or asphaltenes as fillers and stabilizers.

Further, asphalt and its component fractions such as asphaltenes, have found a considerable application in such uses as roofing, alone or as an impregnant for sheet material, caulking, paving, etc. The requisite characteristics of asphaltic materials for various applications are not exactly understood, and empirical determinations are in general used to select material suitable for a given purpose. It is recognized that asphalts can be modified so as to be more satisfactory for certain applications, modification being accomplished through such expedients as air-blowing, addition of fillers, addition of modifying diluents such as rubber, etc. Our novel process, in one aspect, has as its object the provision of a unique and convenient means for modifying an asphalt with a vinyl polymer in intimate composite, without the necessity for extensive physical mixing operations, such as blending on a Banbury mill.

Additional objects of our invention will be apparent to those skilled in this art, in light of this specification.

It is well known that metals are present in crude oil as produced from natural deposits, and the characteristics of these metals are determined generally by the type of rock structure from which the crude oil has been obtained. The specific form in which these metals exist is not known with certainty. Some may exist in the form of salts dissolved by the crude oil from the rock strata, as in the case of lime and magnesia, which are present in certain crude oils obtained from dolomitic rock strata; in other cases they may be salts of organic acids present in the crude oils, particularly in the case of nickel, vanadium and iron. When asphalt fractions are separated from crude oils which contain transition metals, appreciable amounts of transition metals are found in the asphalt fractions. It is to asphalt fractions which contain transition metals, and specifically, metals of Groups IVa, Va, VIa and VII of the Periodic Classification of the Elements, that our novel discovery pertains. Illustrative metals in the designated groups are titanium, vanadium, chromium and iron.

Crude oils are generally classified as asphaltic base, paraffin base and mixed-base oils, according to the material which separates from the crude oil upon cooling. The asphalt which can be separated from asphaltic and mixed base oils comprises predominantly condensed aromatic hydrocarbons, which are especially suitable for the manufacture of asphaltic bitumen. The petroleum asphalt is usually separated from the other fractions of crude oil by vacuum distillation or by the process of propane deasphalting. Products thus obtained are termed "residual asphalts" and comprise suitable stock for use in our novel process, as set forth hereinabove. Further, the amount of asphaltic material can be increased above that recoverable as residual asphalt if the total bottoms fraction from vacuum distillation of crude oil is air-blown before separation of the asphalt fraction. Such an increased asphaltic fraction is termed a "blown asphalt." These blown asphalts also comprise suitable stock for use in our novel process.

In addition to the large quantities of asphalt derived from petroleum refining operations, there are numerous natural deposits which are mined, or worked in other ways, and which provide a considerable proportion of the total asphalt supply. Any of these natural asphalts which contain the requisite transition metal components are also suitable for use in our process.

A total asphalt can be separated by solvent fractionation with paraffinic hydrocarbons into two major fractions. The soluble fraction comprises highly adhesive, brown, semi-solid resinous materials; the insoluble fraction comprises material called "asphaltenes." These latter are brownish-black solids, soluble in benzene, but not in the light paraffinic solvents. The asphaltenes are principally carbon and hydrogen, though containing appreciable amounts of sulfur, oxygen, nitrogen and the metal components of the total asphalt. Asphaltenes are a suitable material for the practice of our process.

The polymerizable vinyl compounds having utility for our process are suitably the alkenes and alkadienes of the formula $RCH:CH_2$, wherein R can be hydrogen, or an alkyl, alkenyl or aryl group, or a combination of such groups. Exemplary suitable compounds are such as: ethylene; propylene, 1-butene; 1-pentene; 1-heptene; 1-octene; 1-dodecene; 1-tetradecene; 1-hexadecene; 3-methyl-1-butene; 4-methyl-1-pentene; 5-methyl-1-hexene; styrene; butadiene; isoprene; chloroprene; mixtures thereof, and the like. Our preferred vinyl compounds are those containing from two to eight carbon atoms per molecule.

The proportion of asphalt, by which term we mean any suitable asphalt as defined hereinabove, to be used in conjunction with the selected vinyl compound in preparing an intimate composite according to the method of our invention can vary from less than one percent to in excess of ninety-nine percent. The amount to be used in any given case should be selected according to the use intended for the composite product. For example, for paving purposes, ten percent, and as little as one percent, of ethylene in an ethylene-asphalt composite, is an appropriate amount. For wire insulation purposes, ninety percent and as much as ninety-nine percent or more of ethylene in an ethylene-asphalt composite is appropriate. Other applications may require other proportions of the asphalt and the vinyl compounds selected for preparation of a composite; suitable proportions for varied uses can be readily determined by one of ordinary skill in this art, through testing procedures known to the art.

As set forth hereinabove, the asphalt suitable for use in our inventive process contains one or more transition metals. In order that the polymerization reaction proceed at a reasonable rate, it is desirable that the total amount of metals be in excess of 1 part per million and, preferably, in excess of 25 parts per million. The polymerization of the selected vinyl compound is initiated by addition of a reducing agent to the mixture of asphalt and polymerizable vinyl monomer. It is likely that the polymerization depends upon formation of a "Ziegler" type catalyst system, from the transition metal in the asphalt, in combination with the reducing agent. We are not certain of the mechanism of catalysis, however, and do not mean to be bound by the hypothesis presented here.

We have discovered that polymerization can be carried out according to our novel process, whatever may be the mechanism of that process, and that there results an intimate composite of asphalt with high molecular weight polymer.

The reducing agents suitable for use in our inventive process are metallic reducing agents such as the hydrides, alkyls, aryls and sesquihalides of the metals in Groups I, II, III and IV of the Periodic Classification of the Elements. Because of their more rapid reaction, we prefer the organometallic compounds containing at least one hydrocarbon radical bonded to metal. The agents we most prefer to use, because of handling convenience, ready availability and facile reaction are the organoaluminums, for example, aluminum tri-ethyl, aluminum tri-isopropyl, aluminum tri-isobutyl, aluminum diethyl chloride, aluminum di-isobutyl hydride, etc. The amount of reducing agent to be used is suitably from about 0.001 to 10 g. per gram of asphalt and preferably from 0.01 to 1 g. per gram of asphalt.

Our novel process can be conducted in an inert reaction medium, such as a normally liquid saturated aliphatic or aromatic hydrocarbon and even a relatively unreactive alkene, such as one containing a non-terminal double bond. By "substantially inert reaction medium," we mean to include media which remain liquid under the selected polymerization conditions and which do not substantially interfere with the reaction or deleteriously affect the polymer.

The temperature for operating our novel polymerization process is suitably from about 0° C. to about 300° C. We prefer to operate within the range of 20° C. to 250° C. in order to have good control of the reaction and we find temperatures between 150° C. and 200° C. to be especially desirable.

The pressure to be used during our polymerization process can range from atmospheric pressure to as much as 10,000 p.s.i. We have found pressures within the range of 100 to 2000 p.s.i. to be especially suitable for our novel process. The pressure should be sufficient to maintain a liquid phase in the reaction mixture.

The preparation of an asphalt and vinyl compound composite, according to the method described herein, has been accomplished as follows:

An asphalt known as "Roofer's Coating Asphalt" was selected for purposes of this experiment. This asphalt was obtained by air-blowing the reduced crude fraction, from crude oil refining, until the asphalt attained a roofing asphalt penetration value. The softening point of this asphalt was 175° F. The ASTM penetration, determined according to ASTM Penetration Test D–243–36 was:

| Temperature, ° F.: | Penetration |
| --- | --- |
| 32 | 22 |
| 77 | 38 |
| 115 | 108 |

The elemental constitution of asphalts prepared as described in this example average as follows:

| Element: | Amount |
| --- | --- |
| Nickel, p.p.m. | 53 |
| Vanadium, p.p.m. | 1.40 |
| Sulfur, percent | 1.58 |
| Carbon, percent | 87.71 |
| Hydrogen, percent | 7.76 |
| Nitrogen, percent | 0.85 |
| Oxygen, percent | 1.93 |

The total asphalt was subjected to a diethyl ether extraction, leaving insoluble asphaltenes which were used in the following polymerization.

A 4.5 g. sample of asphaltenes, with 1.11 g. of aluminum tri-isobutyl was placed in a bomb reactor with 125 mls. of benzene. Ethylene was introduced to a pressure of 400 p.s.i.g. and the temperature was brought to 150° C. During the reaction period, the temperature was maintained at 150° C. and the pressure was maintained between 900–1300 p.s.i.g. by addition of ethylene as required. The reaction was terminated after 20 hours, solvent was removed and 11 g. of a solid polymeric product was obtained which was molded at 180° C. to form a glossy black pliable film. This film is particularly suitable for use as a garden mulch material being less expensive than ordinary polyethylene because of its high asphaltene content, while having superior stability to ultra-violet light degradation. Further, the black color provides for enhanced heat absorption for warming plant roots, while the film holds moisture in the ground in the same way as ordinary polyethylene films.

In similar fashion, other asphalt and vinyl compound composites can be prepared from blown asphalt, residual asphalt, and natural asphalt, with such vinyl compounds as propylene, 1-butene, 1-pentene, styrene, etc.

Reducing agents such as those set forth elsewhere in this specification can be substituted for the aluminum tri-isobutyl of this example.

Having thus described our novel process for preparing a composite of a vinyl compound and an asphalt, what we claim is:

1. A polymerization process which comprises contacting (1) a polymerizable vinyl compound with (2) an asphaltic material containing a transition metal selected from Groups IV, V, VI and VIII in the presence of (3) a metallic reducing agent selected from the group consisting of the hydrides, alkyls, aryls and sesquihalides of Group I, II, III and IV metals, under polymerizing conditions of temperatures and pressure.

2. The process of claim 1 wherein the polymerizable vinyl compound is an alkene of the formula $RCH:CH_2$ wherein R is selected from the group consisting of hydrogen and alkyl, alkenyl and aryl groups containing from 2 to 6 carbon atoms.

3. The process of claim 1 wherein the polymerizable vinyl compound is ethylene and the asphaltic material is an asphaltene.

4. A polymerization process wherein ethylene is contacted with a vanadium-containing asphaltene, in an inert hydrocarbon, in the presence of a catalytic amount of an organo-aluminum compound, at a temperature within the range of 20° C. to 250° C. and a pressure sufficient to maintain a liquid phase.

5. The process of claim 4 wherein the organo-aluminum compound is aluminum tri-isobutyl.

References Cited by the Examiner

UNITED STATES PATENTS

| | | | |
| --- | --- | --- | --- |
| 2,020,714 | 11/1935 | Wulff et al. | 87—9 |
| 2,420,082 | 5/1947 | Klinger | 260—28 |
| 2,545,963 | 3/1951 | Mack | 196—22 |
| 2,938,000 | 5/1960 | Wamless et al. | 252—429 |
| 3,041,282 | 6/1962 | Gordon et al. | 252—46.4 |
| 3,146,118 | 8/1964 | Thorpe | 106—278 |

MORRIS LIEBMAN, *Primary Examiner.*

J. A. GAZEWOOD, *Assistant Examiner.*